United States Patent
Small, Sr.

(10) Patent No.: US 6,311,735 B1
(45) Date of Patent: Nov. 6, 2001

(54) COLLAPSIBLE PLENUM

(76) Inventor: Terrell J. Small, Sr., 309 Virginia Pl., Fort Worth, TX (US) 76107

(*) Notice: Subject to any disclaimer, the term of this patent is extended or adjusted under 35 U.S.C. 154(b) by 0 days.

(21) Appl. No.: 09/276,355

(22) Filed: Mar. 25, 1999

Related U.S. Application Data

(60) Provisional application No. 60/079,510, filed on Mar. 26, 1998.

(51) Int. Cl.[7] .................................................. F16L 11/14
(52) U.S. Cl. .......................... 138/119; 138/109; 138/128; 138/158; 138/167
(58) Field of Search .................................. 138/109, 119, 138/128, 149, 158, 167, 168, 169

(56) References Cited

U.S. PATENT DOCUMENTS

| | | | |
|---|---|---|---|
| 2,039,886 | 5/1936 | Cohn | 138/75 |
| 2,183,174 | 12/1939 | Smith | 138/39 |
| 2,352,876 | * 7/1944 | Wilson | 138/151 |
| 2,386,414 | 10/1945 | Watnick | 257/136 |
| 2,498,753 | * 2/1950 | Deitsch | 138/158 |
| 2,627,430 | * 2/1953 | Koffler | 138/168 |
| 2,916,054 | 12/1959 | Callan | 138/64 |
| 3,092,529 | * 6/1963 | Pearson | 138/149 |
| 3,212,529 | * 10/1965 | Ullman et al. | 138/149 |
| 3,251,382 | * 5/1966 | Tatsch | 138/151 |
| 3,331,305 | * 7/1967 | Oneson | 138/158 |
| 3,593,468 | 7/1971 | Bustin | 52/27 |
| 3,601,032 | 8/1971 | Lambert | 98/40 D |
| 3,649,398 | * 3/1972 | Keith | 138/149 |
| 3,818,948 | * 6/1974 | Hedges | 138/119 |
| 3,918,354 | 11/1975 | Lambert | 98/40 D |
| 4,508,237 | 4/1985 | Kreeger et al. | 220/6 |
| 4,528,053 | 7/1985 | Auer | 156/204 |
| 4,729,227 | 3/1988 | Peden | 62/263 |
| 5,062,280 | 11/1991 | Martin | 62/291 |
| 5,085,251 | 2/1992 | Popelka et al. | 138/119 |
| 5,103,872 | * 4/1992 | Jyh-Long | 138/158 |
| 5,316,165 | 5/1994 | Moran, Jr. | 220/62 |
| 5,391,840 | * 2/1995 | Hughes et al. | 138/149 |
| 5,918,644 | * 7/1999 | Haack et al. | 138/149 |

* cited by examiner

Primary Examiner—James Hook
(74) Attorney, Agent, or Firm—Guy V. Manning

(57) ABSTRACT

A collapsible, pop-up plenum for central heating and air conditioning equipment folds substantially flat for shipping and storage. The plenum's planar sidewalls form a rectangular box having an open input end. An endwall opposite the input end is attached by one edge to one sidewall and adapted to swing open and lay against said sidewall, allowing the plenum to fold flat for storage and transportation. A metallic, flanged collar adapted to attach the input end to the equipment cabinet is hinged to collapse with the plenum. Tightness of the plenum's metallized, elastic skin causes the plenum to spring open when released from its wrapping, facilitating assembly and installation.

13 Claims, 2 Drawing Sheets

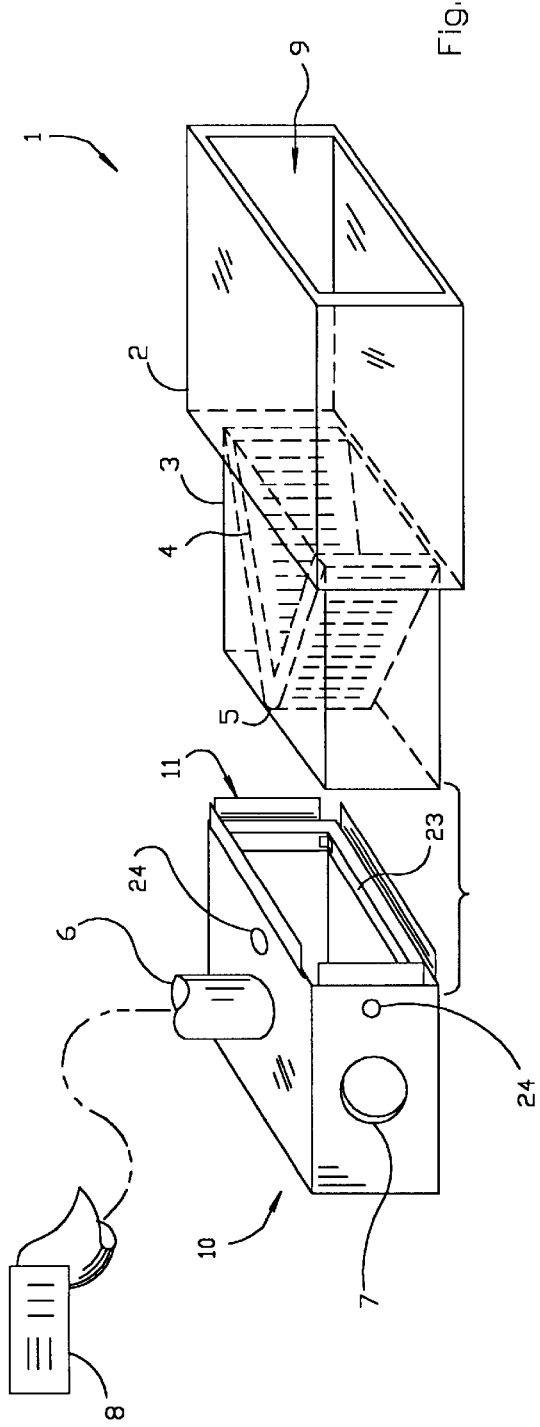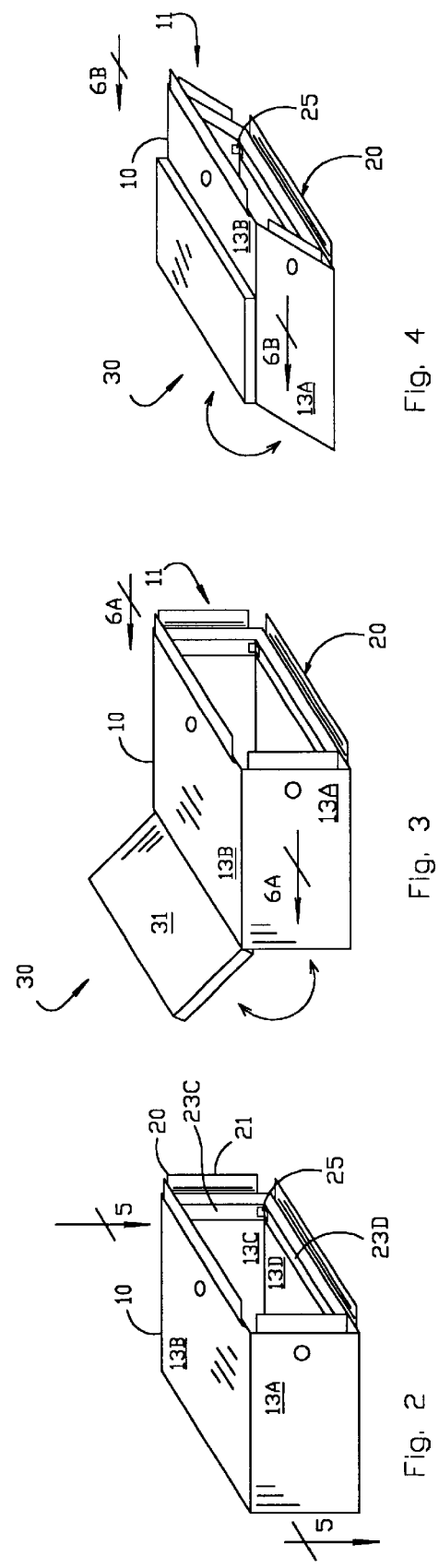

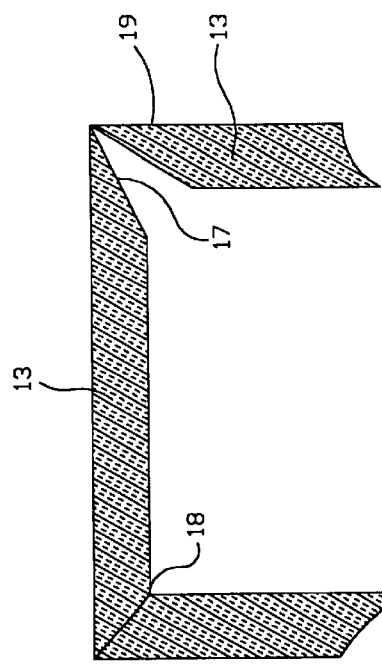
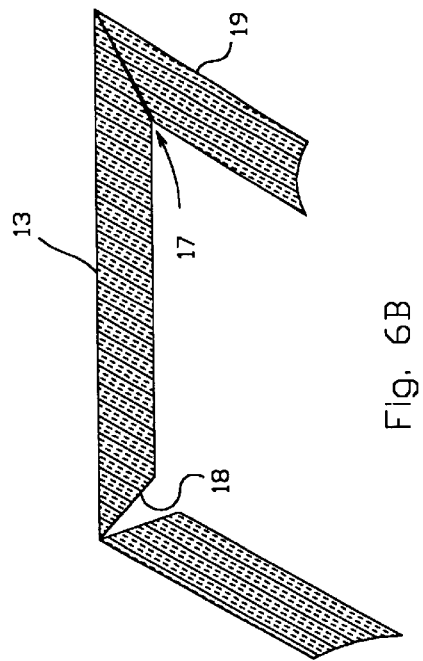
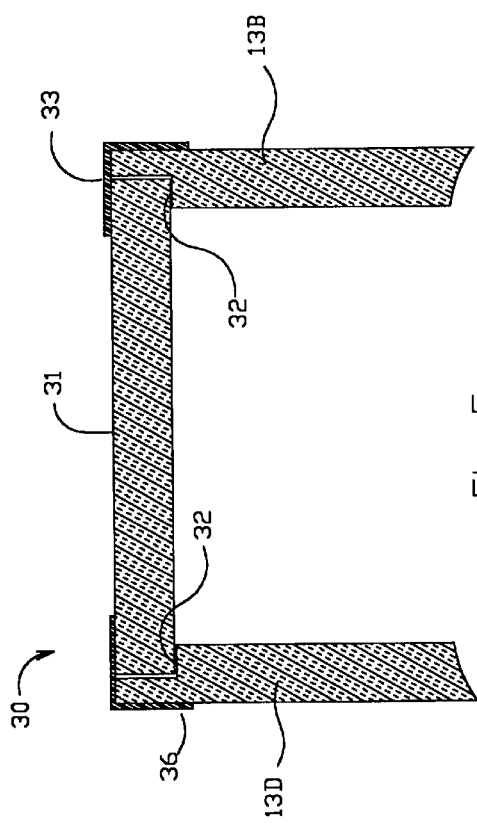

COLLAPSIBLE PLENUM

This application claims priority from a Provisional Application for the same subject matter filed Mar. 26, 1998, having Ser. No. 60/079,510.

BACKGROUND OF THE INVENTION

1. Field of the Invention

This invention relates to improvements to air conditioning and heating equipment, and particularly to air distribution ducting and plenums.

2. Description of Related Art

Conventional indoor central air conditioning and heating equipment comprises a blower which forces air through a heat exchanger, all contained within one or more cabinets coupled between an air intake and distribution ducting. Typically, a final chamber, or plenum, is coupled to the outfall of the last cabinet, and one or more ducts extend to remote registers where air is expelled into the living space, eventually to return to the central air intake.

The plenum typically comprises a box open at one end to the cabinet and closed at the opposite end. The plenum is sized to match the outfall of the cabinet and to create a chamber in which conditioned air is pressurized by the air handler for distribution. The plenum and duct lines usually are composed of insulated duct board or sheet metal and flexible duct, both having a metalized skin to minimize heat transfer to and from the unconditioned spaces of the building, typically an attic, where temperatures more closely match outside conditions.

Conventional plenums typically are fabricated separately and attached to the cabinet outfall during construction. Sometimes fabricated at the building site, more commonly they are prefabricated elsewhere and shipped, sometimes for significant distances. Being mostly empty boxes, they occupy significant space relative to their weight, especially when multiple plenums are shipped and/or held together for inventory. A need exists for an efficient means for storage and shipping of prefabricated plenums.

Indoor air conditioning and heating equipment often is installed in relatively inaccessible places. During construction, for example, the equipment may be moved into an attic space before the roof or ceiling is installed. Once the roof and ceiling both are in place, a relatively small access door may severely restrict the installer's ability to move bulky objects to the attic. A need exists for a collapsible plenum which more easily may be transported into tight spaces and then expanded for use.

SUMMARY OF THE INVENTION

Accordingly, it is an object of this invention to provide a collapsible plenum which easily may be transported into limited access spaces and expanded for use.

It is another object of this invention to provide a collapsible plenum which is efficient for storage and shipping.

It is another object of this invention to provide a collapsible plenum which is easy to expand and install.

It is yet another object of this invention to provide a collapsible plenum which is competitively priced.

The foregoing and other objects of this invention are achieved by providing a collapsible, pop-up plenum which folds flat for shipping and storage. The plenum's planar sidewalls form a rectangular box having an open input end. An endwall opposite the input end is attached by one edge to one sidewall and adapted to swing open and lay against said sidewall, allowing the plenum to fold flat for storage and transportation. A metallic, flanged collar adapted to attach the input end to the air conditioning cabinet is hinged to collapse with the plenum. Tightness of the plenum's elastic, skin causes the plenum to spring open when released from its wrapping, facilitating assembly and installation.

BRIEF DESCRIPTION OF THE DRAWINGS

The novel features believed characteristic of the present invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

FIG. 1 depicts in perspective a plenum and an air conditioning cabinet exploded to show the plenum interface.

FIG. 2 shows the plenum of FIG. 1 expanded for installation.

FIG. 3 details the foldable endwall of the plenum.

FIG. 4 depicts the plenum partially collapsed.

FIG. 5 details the interface between the endwall and the plenum sidewalls.

FIGS. 6A and 6B detail an interface between plenum sidewalls.

DETAILED DESCRIPTION OF A PREFERRED EMBODIMENT

With reference now to the figures, and in particular to FIGS. 1, 2 & 3, air conditioner unit 1 is shown comprising furnace or air handler cabinet 2 coupled in sequence to coil cabinet 3 containing cooling and/or heating coils 4. Outfall 5 of coil cabinet 3 couples to plenum 10 at mouth 11. Plenum 10 is closed at its end opposite mouth 11, and one or more flexible ducts 6 extend to remote registers 8 where conditioned air is expelled into the building, eventually to return to unit 1 by way of intake 9. Thereby, interior air of the building is recycled through unit 1 for filtering and heating and/or cooling.

Plenum 10 comprises sidewalls 13A–13D coupled edge-to-edge by skin 19 to define a chamber having a rectangular cross section substantially matching outfall 5 of coil cabinet 3. Each corner between sidewalls 13 includes notch 17 (FIGS. 6A and 6B) made up of bevels 18 along the edge of each sidewall. Notches 17 form the interface between two adjacent walls, and bevels 18 meet when the sidewalls are disposed for installation, as shown in FIGS. 1–3.

As seen in FIGS. 4 and 6B, plenum 10 collapses, rhomboidly, into a relatively flat package for storage and shipping. This is achieved because notches 17 remove material on the inside of at least two opposite corners of plenum 10, allowing those corners to collapse into very acute angles (FIG. 6B). For the rectangular cross section depicted in the figures, the edges of sidewalls 13 have bevels 18 that are substantially forty-five (45 deg.) degrees relative to skin 19, the angle necessary for the beveled surfaces to touch when sidewalls 13 are at right angles to each other. One having ordinary skill in the art will recognize that plenums with cross sections other than rectangular or square will include bevels 18 having different angles relative to skin 19, as defined by the geometry of the cross section. In all cases, it is preferred that bevels meet when sidewalls 13 are disposed for installation, thus maintaining the insulation value to plenum 10.

Skin 19 completely surrounds sidewalls 13A–13D for their entire length. Skin 19 is composed of aluminized and nylon-reinforced paper conventionally used in the industry for such purposes. Skin 19 comprises enough elasticity to allow it to stretch when sidewalls 13 are folded. Collapsing plenum 10 draws skin 19 tight so that it provides a springing action when released from its wrapping, causing plenum 10 to pop open. Also, some compression of the fiberboard material remaining after notches 17 are cut improves the springiness of plenum 10 when it is released from its collapsed position for installation. Preferably, plenum 10 will be held in collapsed position by tightly drawn plastic or shrink-wrap material (not shown) for shipping and storage.

Metallic collar 20 on plenum 10 at mouth 11 bears flange 21, held in place by rivets 24. Flange 21 attaches directly to coil cabinet 3 by conventional means (typically screws, not shown) to join plenum 10 and coil cabinet 3 at outfall 5. Collar 20 further comprises casing components 23A–23D lining the insides of sidewalls 13A–13D respectively immediately inside mouth 11. Casings 23 couple together at their ends by hinges 25 so that they easily collapse when plenum 10 collapses (FIG. 4). One having ordinary skill in the art will recognize that other coupling means may be employed to unite casings 23 without departing from the spirit and scope of the present invention, including press-brake seams in a single strip of metal the length of casings 23A–23D.

Bulkhead 30 closes the end of plenum 10 opposite mouth 11 and secures it into its rectangular shape for installation. Bulkhead 30 comprises door 31 which fits snugly into grooves 32 cut in the edges of sidewalls 13 (FIG. 5) opposite mouth 11. When in place in grooves 32, door 31 prevents plenum 10 from collapsing. As seen in FIGS. 3–5, door 31 attaches by hinge means 33 to sidewall 13B and folds against sidewall 13B for storage and shipping. Hinge means 33 may comprise a metallic hinge, like casing hinges 25, but more preferably, hinge means 33 is a strong lamination of duct tape adapted to be permanently adhesive once in place. One having ordinary skill in the art will recognize that door 31 could attach to and fold against any one of sidewalls 13 and work properly. Preferably, however, door 31 attaches to one of the longer sidewalls 13B or 13D, thereby maximizing the length and stability of hinge means 33. When assembled for installation, the other three edges of door 31 are sealed with sealing means 36, typically duct tape, to their respective sidewalls 13A, 13C and 13D, thus preventing air leakage through grooves 32.

In operation, plenum 10 is fabricated from a single piece of bulk fiberboard or other suitable material bearing skin 19 and cut to fit a given coil cabinet outfall. The fiberboard initially is a planar rectangle having long sides equal to the sum of sidewalls 13A–13D, and its short sides the length of plenum 10 between mouth 11 and bulkhead 30. Groove 32 is cut along one long side, and collar 20 is fabricated and attached along the other. Notches 17 are cut paralleling the short sides into the surface of the fiberboard opposite skin 19 to produce bevels 18. Notches 17 are aligned with hinges 23, thereby defining sidewalls 13A–13D. Typically, a lap groove not shown is cut on the short sides, but one having ordinary skill in the art will recognize that this could be done with notches 17 as well. In either case, this corner will be bifurcated, with each half being cut along opposing short sides, later to be united when the fiberboard is folded to form sidewalls 13.

Door 31 is attached to one sidewall 13 by hinge means 33 where it can mate with grooves 32 when swung into place. Door 31 then is swung open to lie flat against sidewall 13 and plenum 10 is collapsed and wrapped for storage and shipping. Plenum 10 eventually arrives at a job site and is moved into place for installation. When plenum 10 is unwrapped, skin 19 contracts and pulls plenum 10 into near rectangular shape, assisted to some degree by the compressed fiberboard material in the acute angled notches 17. Door 31 is swung into grooves 32 and sealed to complete and secure the rectangular cross section of plenum 10. Plenum 10 then is bolted or screwed to coil cabinet 3 using flange 21. Duct interfaces 7 (FIG. 1) then may be cut into sidewalls 13 and door 31 as needed for the particular installation.

Multiple plenums may be stacked for storage or enclosed into cartons for protection. In such fashion, they occupy significantly less space than like plenums assembled into their installation shape. Likewise, more efficient shipping rates may be obtained because significantly more plenums per volume can be shipped that could be done with assembled, hollow plenums. In its collapsed shape, plenum 10 easily may be carried up a folding stairway into the attic of a residence even if it is too large to do so when assembled. Secured by door 31 and coil cabinet 3, plenum 10 is highly stable and very strong.

While the invention has been particularly shown and described with reference to a preferred embodiment, it will be understood by those skilled in the art that various changes in form and detail may be made therein without departing form the spirit and scope of the invention. For example, plenum 10 is shown in the figures as rectangular in cross section but it could comprise square, hexagonal, octagonal or other regular or irregular cross sections as long as it includes sides collapsible for shipping and storage. Also, latch means (not shown) could be included as part of collar 20 to secure plenum 10 in its collapsed disposition. Said latch means could comprise any of a variety of known devices, such as a screen door hook attached to casing 23A with mating eyelet disposed an appropriate distance from one end of opposite casing 23C. Additionally, sealing means 36 has been described above as comprising duct tape, but could comprise a zipper (not shown) for the installer's convenience. Such zipper could encompass hinge 33, as well, allowing complete removal of door 31. Door 31 may or may not be made of fiberboard material.

I claim:

1. A collapsible plenum for a central heating or air conditioner unit, the collapsible plenum comprising
   substantially rectangular sidewalls having an outer skin and juxtaposed to form a chamber having a distal end and a proximate end, the proximate end having an inlet adapted to couple to the unit;
   a removable bulkhead at the distal end and having
      a door adapted to be received within a recessed groove in the distal end;
      sealing means for sealing the door into the groove; and
      hinge means coupling the door to one of the sidewalls; and
   a collapsible collar surrounding the inlet and having flanges adapted to attach to the unit.

2. The collapsible plenum according to claim 1 wherein the sealing means comprises
   zipper means for uniting one or more edges of the door with a bulkhead end of a corresponding sidewall.

3. The collapsible plenum according to claim 2 wherein the zipper means comprises
   pairs of parallel zipper strips, one each of the paired strips adhering permanently to the door and one of the paired strips adhering to the adjacent sidewall whereby the strips may be united by operating a zipper mechanism when the door is received within the groove.

4. The collapsible plenum according to claim 2 wherein the zipper means provides the hinge means, making the door removable from the plenum.

5. A collapsible plenum for an air conditioner or furnace unit, the plenum comprising
substantially rectangular side walls juxtaposed to form a chamber having an inlet at one end;
a removable bulkhead closing the chamber opposite the inlet and including
a door recessed into a groove in the distal ends of the plenum sidewalls;
sealing means for sealing the door into the groove; and
hinge means coupling the door to one of the sidewalls; and
a collapsible collar surrounding the inlet, said collar having
metallic casings disposed inside the inlet substantially the width of each sidewall;
coupling means for coupling together the casings on adjacent sidewalls; and
flanges extending substantially flush with and parallel the sidewalls from the casings and adapted to couple the plenum to the unit.

6. The collapsible plenum according to claim 5 wherein the coupling means comprises press-brake seams.

7. A collapsible plenum for a central heating or air conditioner unit, the collapsible plenum comprising
substantially rectangular sidewalls having an outer skin and juxtaposed to form a chamber having a distal end and a proximate end, the proximate end having an inlet adapted to couple to the unit;
a removable bulkhead at the distal end;
a collapsible collar surrounding and affixed permanently to the inlet, said collar having flanges adapted to attach to the unit.

8. The collapsible plenum according to claim 7 wherein the collar is rhomboidally collapsible.

9. A collapsible plenum for a central heating or air conditioner unit, the collapsible
plenum comprising
substantially rectangular sidewalls having an outer skin and juxtaposed to form a chamber having a distal end and a proximate end, the proximate end having an inlet adapted to couple to the unit;
a removable bulkhead at the distal end; and
a rhomboidically collapsible collar surrounding the inlet, said collar having flanges adapted to attach to the unit.

10. The collapsible plenum according to claim 9 wherein
the collar is affixed permanently to the inlet; and
the removable bulkhead is hinged to the distal end.

11. A collapsible plenum for a central heating or air conditioner unit, the collapsible plenum comprising
substantially rectangular sidewalls having an outer skin and juxtaposed to form a chamber having a distal end and a proximate end, the proximate end having an inlet adapted to couple to the unit;
a collapsible collar surrounding the inlet, said collar having flanges adapted to attach to the unit; and
a removable bulkhead hinged to the distal end.

12. A collapsible plenum for a central heating or air conditioner unit, the collapsible plenum comprising
substantially rectangular sidewalls having an outer skin and juxtaposed to form a chamber having distal and proximate ends, the proximate end having an inlet adapted to couple to the unit;
a removable bulkhead at the distal end; and
a collapsible collar surrounding the inlet and having
metallic casings disposed inside the inlet substantially the width of each sidewall;
flanges coupled to the casings and extending toward the cabinet substantially flush with and parallel the sidewalls; and
hinges coupling the casings together end-to-end.

13. A collapsible plenum for a central heating or air conditioner unit, the collapsible plenum comprising
substantially rectangular sidewalls having an outer skin and juxtaposed to form a chamber having a distal end and a proximate end, the proximate end having an inlet adapted to couple to the unit;
a removable bulkhead at the distal end; and
a collapsible collar surrounding the inlet and having
metallic casings disposed inside the inlet substantially the width of each sidewall;
flanges coupled to the casings and extending toward the cabinet substantially flush with and parallel the sidewalls; and
press break seams coupling the casings together end-to-end.

* * * * *